Figure 1:
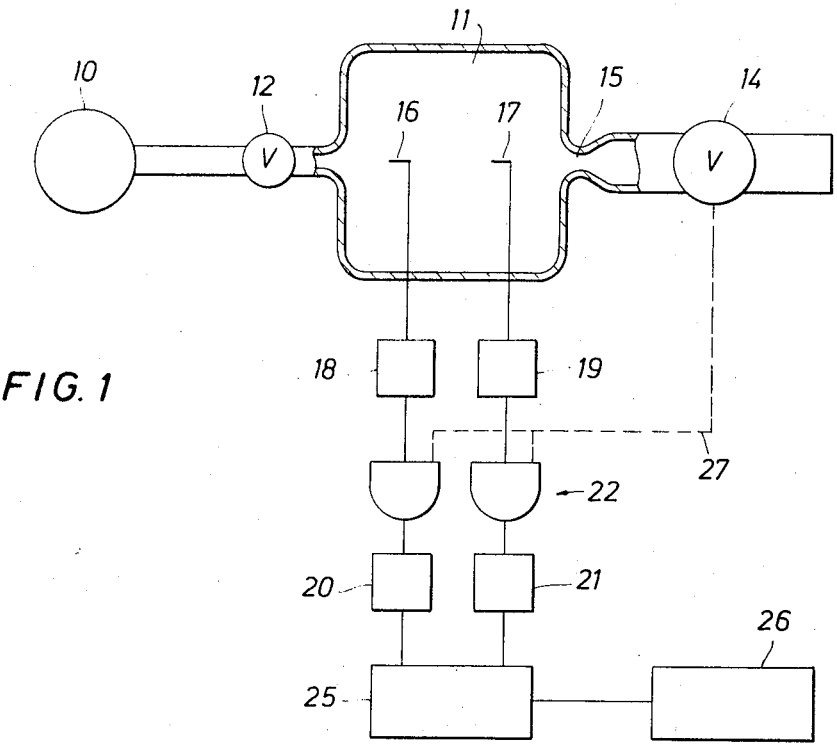

United States Patent [19]
Ducousset

[11] 3,750,472
[45] Aug. 7, 1973

[54] APPARATUS FOR MEASURING THE MASS FLOW OF GASES

[75] Inventor: Robert Eugene Raymond Ducousset, Clamart, France

[73] Assignee: Compagnie Des Compteurs, Paris, France

[22] Filed: Feb. 1, 1971

[21] Appl. No.: 111,297

[30] Foreign Application Priority Data
Feb. 6, 1970 France .................................. 7004219

[52] U.S. Cl. ................... 73/205 D, 73/3, 73/194 M, 73/211
[51] Int. Cl. .............................................. G01f 1/00
[58] Field of Search ...................... 73/194 M, 211, 3, 73/213, 205, 205 D

[56] References Cited
UNITED STATES PATENTS

| | | | |
|---|---|---|---|
| 3,333,468 | 8/1967 | Jacobs | 73/194 M |
| 3,251,226 | 5/1966 | Cushing | 73/205 |
| 3,240,061 | 3/1966 | Bloom et al. | 73/211 |
| 3,115,777 | 12/1963 | Hockreiter | 73/194 M |
| 2,780,938 | 2/1957 | Chamberlain | 73/194 M |

FOREIGN PATENTS OR APPLICATIONS

| | | | |
|---|---|---|---|
| 209,120 | 11/1955 | Australia | 73/194 M |

OTHER PUBLICATIONS
Fluid Mechanics, by Richard H. F. Pao, Publ. by John Wiley, N. Y., 1961 – pp. 340 thru 342.
"Testing Small Orifices" by Benson & Hawk –published in Instruments & Control Systems, vol. 33, pp. 996–998.

*Primary Examiner*—Richard C. Queisser
*Assistant Examiner*—John P. Beauchamp
*Attorney*—William R. Sherman, Jerry M. Presson and Walter C. Farley

[57] ABSTRACT

The disclosed apparatus measures the mass rate of flow of gas through an orifice of a flow nozzle under critical flow conditions and comprises a reservoir having an inlet connected to a source of high pressure through a first valve and an outlet connected to a flow nozzle adapted to conduct pressurized gas from said reservoir under critical flow conditions to a region of low pressure downstream of the flow nozzle. The critical flow conditions are established by a second valve mounted downstream of the nozzle orifice. Density and pressure measuring devices are coupled to the reservoir and provide signals representative of the density and pressure, respectively, of the gas flowing through the flow nozzle. The density and pressure signals are applied to a device which calculates the square root of the product of density and pressure to provide a signal proportional to the mass rate of gas flow.

In a first embodiment, the second valve is operatively coupled to the calculating device in order that this device provides a signal only when the second valve is opened.

In a second embodiment the density measuring device is operatively coupled to the first valve in order to maintain the density of the gas flowing through the flow nozzle at a constant value.

8 Claims, 3 Drawing Figures

Robert E. R. Ducosset
INVENTOR

BY *signature*

ATTORNEY

APPARATUS FOR MEASURING THE MASS FLOW OF GASES

Those skilled in the art will appreciate that it is difficult to measure with precision the mass flow of gas passing through a conduit. One flow-measuring technique which has been considered heretofore employs a so-called "critical flow" nozzle which characteristically functions in such a manner that when the upstream pressure of the gas entering the nozzle is maintained at a sufficiently high "critical pressure", the mass rate of flow of the gas through the nozzle will be at a maximum value. When this occurs, the outlet or downstream pressure will be about half the inlet pressure and a further decrease of the outlet pressure will not produce any further increase in the mass rate of flow through the nozzle. The velocity of the gas passing through the nozzle throat is at this time equal to the velocity of sound in that gas. Under these conditions, when the maximum mass rate of flow is obtained, the ratio of the outlet pressure to the inlet pressure is termed the "critical pressure ratio".

To employ the "critical flow" technique for flow measurements, the following equation in English units has generally been used heretofore:

$$w = 0.4727 \rho A \sqrt{RT/G\, \gamma}  \quad \text{(Eq. 1a)}$$

where, $w$ = mass rate of flow at inlet conditions, lbs/sec.
$\rho$ = density of gas at inlet conditions, lbs/cu.ft.
$A$ = throat area of nozzle, sq.in.
$R$ = universal gas constant, ft.lb./lb.mol/°F
$T$ = inlet temperature of gas, °F
$G$ = specific gravity of gas in relation to air
$\gamma = k\,(2/k + 1)\,(k + 1)/(k - 1)$
$k$ = ratio of specific heats ($c_p/c_v$) of gas.

Stating Equation 1a in the KGS system, the equation becomes:

$$Q = SP \sqrt{\delta/RT\, \gamma} \quad \text{(Eq. 1b)}$$

where, $Q$ = mass rate of flow, Kg/sec.
$S$ = throat area of nozzle, sq. meters
$P$ = inlet pressure of gas, Newton/sq.meter
$\delta$ = specific gravity of gas in relation to air
$R$ = universal gas constant = 287 × (Newton-meter)/Kg °K
$T$ = inlet temperature of gas, °K
$\gamma = k\,(2/k + 1)\,(k + 1)/(k - 1)$
$k$ = ratio of specific heats ($c_p/c_v$) of gas.

It will be appreciated that either version of Equation 1 necessitates that the density as well as the temperature of the incoming gas be determined with considerable accuracy to obtain a precise measurement of the mass rate of flow of the gas. Those skilled in the art will appreciate, however, that measuring the temperature of a flowing stream of gas is a potential source of significant error because of temperature variations at different points in the gas stream caused by heat losses, heat gains, and mixing of different portions of the gas.

Accordingly, it is an object of the present invention to provide new and improved measuring apparatus for determining the mass flow rate of gases flowing from a high-pressure region to a low-pressure region.

This and other objects of the present invention are attained by fluidly coupling a source of high-pressure gas to the inlet of a critical flow nozzle for supplying gas thereto at a pressure which is sufficient for creating a maximum or critical rate of flow through the nozzle. In one embodiment of the invention, means are provided for measuring the mass per unit volume as well as the absolute pressure of the gas being supplied to the nozzle and producing corresponding signals representative of these measurements. In an alternative embodiment of the present invention, control means are provided for maintaining the mass per unit volume at a constant value. Circuit means are provided for converting these measurement signals to output signals which are representative of the mass rate of flow of the gas through the nozzle.

Figure 2:
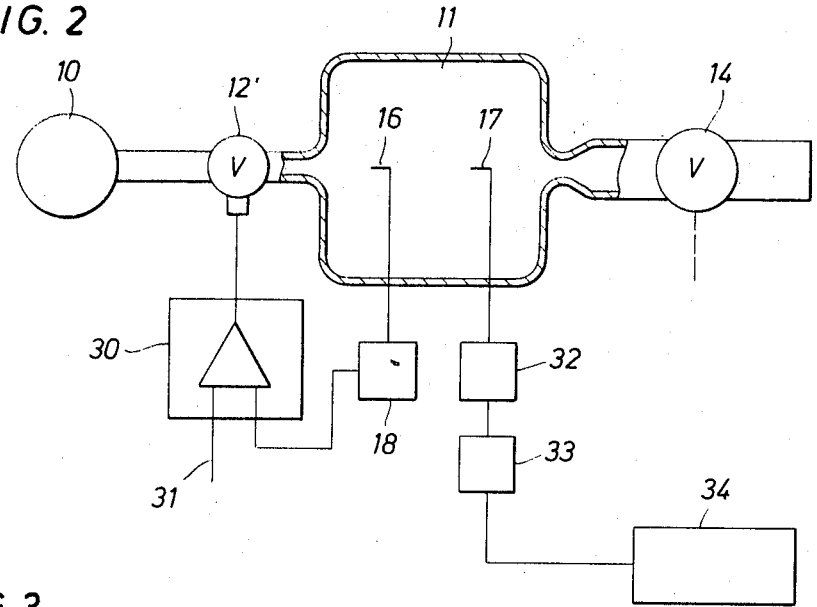
Figure 3:
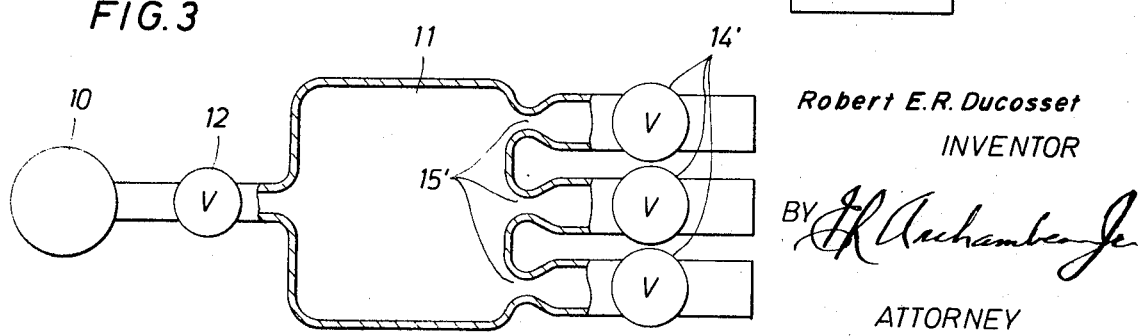

The novel features of the present invention are set forth with particularity in the appended claims. The invention, together with further objects and advantages thereof, may be best understood by way of the following description of exemplary apparatus employing the principles of the invention as illustrated in the accompanying drawing, in which:

FIG. 1 schematically illustrates a preferred embodiment of new and improved measuring apparatus arranged in accordance with the principles of the present invention;

FIG. 2 depicts an alternate embodiment of new and improved measuring apparatus which is also arranged in accordance with the principles of the present invention; and FIG. 3 depicts still another embodiment of the measuring apparatus depicted in FIG. 1.

Turning now to FIG. 1, a source of high pressure gas 10 is coupled to a surge tank or reservoir 11 by means of a suitable control valve 12. To control the flow of gas from the reservoir 11, a selectively-operable control valve 14 is coupled to the outlet of a flow nozzle 15 having its inlet coupled to a convenient location on the reservoir. Gas-sampling means, such as a pair of sampling tubes 16 and 17, are conveniently arranged in the reservoir 11 and coupled to measuring devices 18 and 19 which are respectively adapted for providing precise measurements of the density and the absolute pressure of the gas flowing from the source 10 to the nozzle 15. The significance of the measurements provided by the measuring devices 18 and 19 will subsequently become apparent. The density-measuring device 18 is well known in this art and typically includes a gas-tight enclosure in which a spherical float is operatively coupled to a delicately-balanced, pivotally-mounted arm. In this manner, as a gas whose density is to be measured is admitted to the gas-tight enclosure, the Archimedean or buoyant thrust imposed on the spherical float by the gas will tend to pivot the balance arm away from its normal neutral position a distance corresponding to the density of the gas. A position-deviation detector is cooperatively arranged on the measuring device 18 for generating an electrical current which is proportional to the deviation of the balance arm from its neutral or null position. The position detector is operatively coupled to an electromagnet which is cooperatively arranged for responding to the output signals of the position detector to re-establish the equilibrium of the balance arm. In this manner, a deviation of the balance arm created by the gas in the gas-tight enclosure will generate a corresponding current which actuates the electromagnet to restore the balance arm to its null position. Thus, by cooperatively measuring the magnitude of electrical current required for maintaining the balance arm in its neutral position, precise measurements are obtained of the true density of samples of gas which are admitted to the enclosure surrounding the buoyant sphere.

The pressure-measuring device 19 is similarly arranged for providing an output voltage or electrical current which is representative of the absolute pressure of the gas in the reservoir 11. Those skilled in the art will, of course, appreciate that there are various pressure transducers including a variable electrical device such as a resistance element which can be cooperatively coupled to appropriate electronic circuitry for providing an output voltage or electrical current which is representative of the pressure in the gas reservoir 11.

Alternatively, an automatic equilibrium force balance device somewhat similar to that employed for the density-measuring device 18 can also be employed for providing appropriate electrical signals which are representative of the absolute pressure of gases passing through the reservoir 11.

The pressure measuring device 19 is also well known in this art and typically includes an elongated ribbon of a magnetic material which is held in tension between the free end of a movable pressure-responsive element such as a bellows and a stationary electrical element or vibration pickup cooperatively arranged for producing a signal which is representative of the frequency of vibration of the ribbon in a plane transverse to its longitudinal axis. It will be appreciated, of course, that vibration of the ribbon will be at a resonant fundamental frequency which is proportionally related to whatever tension is then being applied to the ribbon. To continuously vibrate the ribbon, a magnetic field is created by positioning a pair of horseshoe magnets on opposite sides of the mid-point of the ribbon with their arms respectively straddling the ribbon for inducing magnetic fields substantially penpendicular to the direction of vibratory movement of the ribbon. An electromagnetic coil is disposed facing the mid-point of the ribbon and is driven by an amplifier having its input coupled to the stationary vibration pickup.

Accordingly, upon vibration of the tensioned ribbon, the vibration pickup will drive the electromagnetic coil which, in conjunction with the magnetic field of the horseshoe magnets, will maintain the ribbon in continuous vibration at a frequency that is proportionally related to the tension force imposed by the instant position of the bellows. The oscillation frequency of the ribbon is, therefore, directly related to the pressure acting on the bellows at any given moment so that the output signal provided by the amplifier will be directly proportional to the pressure of the gas then flowing through the reservoir 11.

In the preferred manner of converting the density and pressure output signals from the condition-measuring devices 18 and 19, the measuring devices are respectively coupled to current/frequency converters 20 and 21 by a suitable gate circuit 22 which, as will subsequently be explained, is preferably a pair of AND gates. The outputs of the converters 20 and 21 are respectively coupled to an operational circuit 25 which provides output pulse signals that are respectively representative of the square root of the product of the two input signals. The significance of the form of these output pulse signals will subsequently become apparent. The output pulses provided by the operational circuit 25 are coupled to a typical pulse counter 26.

In an embodiment given for exemplary purposes, the operational circuit 25 is basically comprised of counting means for counting pulses from the pulse signal representative of the density measured by the device 18 and multiplying means responsive to the pulse signal representative of the pressure measured by the device 19 for producing a third pulse signal whose instantaneous repetition rate is a function of the product of the instantaneous pulse repetition rate of the pressure pulse signal and the instantaneous content of the counting means. Resetting means are included which are responsive to the third pulse signal for applying a reset signal to the counting means to reset its content to zero, so that the instantaneous repetition rate of the third signal is a function of the square root of the product of the pulse repetition rates of the density and pressure signals.

Accordingly, it will be appreciated that as far as the present invention is concerned, the significant point is that an output signal is produced by the operational circuit 25 which is representative of the square root of the product of the absolute pressure and the density of the gases flowing through the reservoir 11. To determine the mass flow rate of these gases, the following equation in English units is employed:

$$w = 0.4727A \sqrt{\rho P \gamma}$$

(Eq. 2a)

where
$w$ = mass rate of flow at inlet conditions, lbs.sec.
$A$ = throat area of nozzle, sq.in.
$\rho$ = density of gas at inlet conditions, lbs/cu.ft.
$P$ = inlet pressure of gas, psia
$\gamma = k \ (2/k + 1)^{(k + 1)/(k - 1)}$
$k$ = ratio of specific heats $(c_p/c_v)$ of gas.

Stating Equation 2a in the KGS system, the equation becomes:

$$Q = S \sqrt{\rho P \gamma}$$

(Eq. 2b)

where,
$Q$ = mass rate of flow, Kg/sec.
$S$ = throat area of nozzle, sq.meters
$\rho$ = density of gas at inlet conditions, Kg/cu.meter
$P$ = inlet pressure of gas, Newton/sq.meter
$\gamma = k \ (2/k + 1)^{(k - 1)/(k - 1)}$
$k$ = ratio of specific heats $(c_p/c_v)$ of gas.

As will be apparent to those working in the art, the equation 2(b) can be established as follows: the mass rate of flow $Q$ as a function of the throat area $S$ of the nozzle, the critical density $\rho_c$ and the critical velocity $a_c$ of gas is expressed as:

$$Q = S \rho_c a_c$$

with $$a_c = \sqrt{k \ R/G \ T_c}$$

$T_c$ being the critical temperature.
From the perfect gas formula, $PV = RT$, it will be apparent that, $$T = G/R \ P/\rho$$

Consequently, the mass rate of flow $Q$ can be expressed as:

$$Q = S\, \rho_c \sqrt{R/G\ G/R\ P_c/\rho_c} = S\, \sqrt{k}\, \sqrt{P_c\, \rho_c}$$

When replacing $P_c$ and $\rho_c$ by their values as a function of $P$, $\rho$ and $k$ such as $$P = P_c\, (k + 1/2)^{k/k - 1}$$

and $$\rho = \rho_c\, (k + 1/2)^{1/k - 1}$$

$$Q = S\, \sqrt{k}\, \sqrt{P\rho}\, \sqrt{(2/k + 1)^{(k + 1)/(k - 1)}}$$

or $$Q = S\, \sqrt{\rho P \gamma}$$

It will be noted that the 0.4727 coefficient of equation 2($a$) or 1($a$) is related solely to the conversion of cubic feet to cubic inches and a correction for gravity when converting from the meters/second$^2$ (9.81 m.sec.$^2$) to inches/second$^2$ (386.2 in./sec.$^2$) For example, in English units, equation 2($b$) can be expressed as $$Q = (\text{in.})^2 \sqrt{\text{lbs}/(12\ \text{in.})^3\ \text{lbs/in.}^2\ 386.2\ \text{in./sec.}^2}$$
$$= \text{lbs}\ \sqrt{386.2/1728} = 0.4727\ \text{lbs/sec}.$$

It will be appreciated, therefore, that with either of these two equations, for a given gas and a particular flow nozzle 15, the pressure and density of the gas flowing through the reservoir 11 will be the only variables which must be measured to determine the mass flow rate of gases passing through the flow-measuring apparatus of the present invention. Thus, by continually measuring these two variables and producing an output signal representative of the square root of the product of the variables, a continuous and precise measurement is provided of the mass flow rate of the gas passing through the flow nozzle 15.

Accordingly, it will be appreciated that to operate the flow-measuring apparatus of the present invention, gas is admitted from the source 10 to the reservoir 11 by opening the valve 12. The valve 14 is preferably left closed initially to permit the gas pressure in the reservoir 11 to increase to a sufficiently high magnitude to insure the development of critical flow through the nozzle 15 whenever the valve 14 is opened. In one manner of controlling the flow-measuring apparatus, a suitable solenoid-actuated valve is employed for the control valve 14 and an electrical signal is simultaneously applied to the valve 14 and the gating circuit 22 by means of a suitable common conductor as at 27. Thus, with this arrangement, opening of the valve 14 will simultaneously direct an enabling signal to the control inputs of each of the AND gates in the gating circuit 22 for simultaneously applying the density and pressure signals for the condition-measuring devices 18 and 19 to the current/frequency converters 20 and 21. In this manner, as the output signals of the converters 20 and 21 are applied to the operational circuit 25, the output of the circuit will be totalized by the counter 26 to provide a signal which is representative of the mass flow rate of the gas flowing through the flow-measuring apparatus.

Those skilled in the art will, of course, appreciate that the flow-measuring apparatus of the present invention will find particular utility in calibrating other types of flow meters. For example, by connecting the new and improved flow-measuring apparatus upstream of a typical orifice, the orifice may be precisely calibrated over a selected range so that the usual pressure differential measurements customarily obtained with such conventional measuring devices can be subsequently employed for providing accurate mass flow rate measurements.

Turning now to FIG. 2, an alternative embodiment is depicted of flow-measuring apparatus also incorporating the principles of the present invention. The flow-measuring apparatus is arranged substantially in the same manner as that shown in FIG. 1 except that the mass per unit volume of the gas entering the reservoir 11 is maintained at a constant value. As depicted, this is accomplished by employing a typical pneumatically-actuated or solenoid-operated control valve 12' which is driven by the output of a typical differential amplifier 30 to maintain the mass per unit volume of the influent gas at a constant value as determined by the set point established by a selected reference voltage applied to the other input 31 of the amplifier 30.

It will be recognized, therefore, that the pressure of gas in the reservoir 11 will be the only variable remaining to satisfy the conditions of Equation 2. Thus, a suitable pressure-measuring device 32 similar or identical to that shown at 19 in FIG. 1 is operatively coupled to a typical multiplier 33 which multiplies the output signal of the device 32 (which is proportional to the square root of the measured pressure) by a constant coefficient corresponding to the square root of the selected constant mass per unit volume. The output of the multiplier 33 is, in turn, coupled to a suitable totalizing counter 34 to provide an output representing the mass flow rate.

As seen in FIG. 3, the flow-measuring apparatus of the present invention can also be arranged with multiple paralleled flow nozzles, as at 15', which are respectively coupled to selectively-operable control valves 14'. In this manner, whether the controls of FIG. 1 or 2 are employed, different sizes of the nozzles 15' can be selectively employed to provide a wide range of utility for the flow-measuring apparatus.

Accordingly, it will be appreciated that the present invention has provided new and improved flow-measuring apparatus for precisely determining the flow of gases through a flow conduit. By requiring measurements of only certain properties which are capable of accurate and reliable measurement, precise measurements of gas flows can now be made.

While only particular embodiments of the present invention and modes of practicing the invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Flow-measuring apparatus for determining the mass rate of flow of a gas comprising: a reservoir vessel having an inlet connection for connection to a pressured source of gas and an outlet connection; a critical flow nozzle coupled to said reservoir outlet connection for passing pressured gas from said reservoir vessel through said flow nozzle under critical flow conditions to a region of low pressure downstream of the outlet of said flow nozzle; first valve means coupled to said pressured source of gas for controlling the passage of pressured gas from said pressured source of gas to said reservoir vessel; second valve means coupled to said flow nozzle outlet for controlling the passage of pressured gas from said reservoir vessel through said flow nozzle; first measuring means coupled to said reservoir vessel for measuring the density of pressured gas passing from said reservoir vessel through said flow nozzle and providing first signals representative of said gas density; second measuring means coupled to said reservoir vessel for measuring the pressure of pressured gas passing from said reservoir vessel through said flow nozzle and providing second signals representative of said gas pressure; and output means responsive to said first and second signals for providing output signals representative of said mass rate of flow.

2. The flow-measuring apparatus of claim 1 wherein said output signals are electrical signals, and said output means include electrical circuit means cooperatively coupled to said first and second measuring means and adapted for providing said output signals in response to said first and second signals.

3. The flow-measuring apparatus of claim 2 wherein said first and second signals are electrical signals, and said first and second measuring means respectively include first and second electrical means adapted for providing said first and second signals to said electrical circuit means.

4. The flow-measuring apparatus of claim 1 wherein said output means include electrical circuit means cooperatively coupled to said first and second measuring means and adapted for providing said output signals as a function of the square root of the product of said first and second signals, which square root is a function of said mass rate of flow.

5. The flow-measuring apparatus of claim 1 further including control means coupled to said second valve means and to said output means for simultaneously opening said second valve means and enabling said output means whereby said output means provides said output signals whenever said first valve means is opened.

6. The flow-measuring apparatus of claim 1 further including a second critical flow nozzle coupled to said reservoir vessel through a second outlet connection; and third valve means coupled to said second critical flow nozzle for controlling the passage of gas through said second critical flow nozzle.

7. The flow-measuring apparatus of claim 1 wherein said output means include means adapted for providing said output signals as a function of the square root of the product of said first and second signals so that said mass rate of flow can be determined by the equation:

$$w = 0.4727 A \sqrt{\rho P \gamma}$$

where, $w$ = mass rate of gas flow through said flow nozzle, lbs/sec.
$A$ = throat area of said flow nozzle, sq.in.
$\rho$ = density of gas in said reservoir vessel, lbs/cu.ft.
$P$ = pressure of gas in said reservoir vessel, psia
$\gamma = k (2/k + 1)^{(k + 1)/(k - 1)}$
$k$ = ratio of specific heats ($c_p/c_v$) of gas in said reservoir vessel.

8. Flow measuring apparatus for determining the mass rate of flow of a gas comprising: a reservoir vessel having an inlet connection for connection to a pressured source of gas and an outlet connection; a critical flow nozzle coupled to said reservoir outlet connection for passing pressured gas from said reservoir vessel through said flow nozzle under critical flow conditions to a region of low pressure downstream of the outlet of said flow nozzle; first valve means coupled to said pressured source of gas for controlling the passage of pressured gas from said pressured source of gas to said reservoir vessel; second valve means coupled to said flow nozzle outlet for controlling the passage of pressured gas from said reservoir vessel through said flow nozzle; first measuring means coupled to said reservoir vessel for measuring the density of pressured gas passing from said reservoir vessel through said flow nozzle and providing first signals representative of said gas density; second measuring means coupled to said reservoir vessel for measuring the pressure of pressured gas passing from said reservoir vessel through said flow nozzle and providing second signals representative of said gas pressure; control means responsive to said first signals representative of said gas density and connected to the first valve means to apply thereto control signals which are a function of said first signals and control said first valve means to maintain a constant mass per unit volume of the gas in said reservoir; and output means responsive to said second signals representative of the gas pressure in the reservoir for providing output signals representative of said mass rate of flow.

* * * * *